(12) United States Patent
O'Brien et al.

(10) Patent No.: US 12,598,371 B2
(45) Date of Patent: Apr. 7, 2026

(54) TRIGGER FOR CAMERA TRAP

(71) Applicant: DISNEY ENTERPRISES, INC.,
Burbank, CA (US)

(72) Inventors: Thomas John O'Brien, Silver Spring,
MD (US); Eric Berkenpas, Rockville,
MD (US); Charles Michael Shepard,
Silver Spring, MD (US); **Eric Daniel
Flynn**, Dickerson, MD (US)

(73) Assignee: DISNEY ENTERPRISES, INC.,
Burbank, CA (US)

( * ) Notice: Subject to any disclaimer, the term of this
patent is extended or adjusted under 35
U.S.C. 154(b) by 80 days.

(21) Appl. No.: 18/215,386

(22) Filed: Jun. 28, 2023

(65) Prior Publication Data

US 2025/0008209 A1 Jan. 2, 2025

(51) Int. Cl.
| | |
|---|---|
| *H04N 23/61* | (2023.01) |
| *G06V 10/77* | (2022.01) |
| *H04N 23/51* | (2023.01) |
| *H04N 23/56* | (2023.01) |
| *H04N 23/66* | (2023.01) |

(52) U.S. Cl.
CPC ............. *H04N 23/61* (2023.01); *G06V 10/77*
(2022.01); *H04N 23/51* (2023.01); *H04N*
*23/66* (2023.01); *H04N 23/56* (2023.01)

(58) Field of Classification Search
CPC ........ G06V 10/77; H04N 23/51; H04N 23/56;
H04N 23/61; H04N 23/66
See application file for complete search history.

(56) References Cited

U.S. PATENT DOCUMENTS

| | | | | |
|---|---|---|---|---|
| 11,184,552 B2* | 11/2021 | Van Der Sijde | ........ | G06T 7/586 |
| 2002/0003584 A1* | 1/2002 | Kossin | .................... | H04N 23/51 |
| | | | | 348/E5.026 |
| 2014/0341484 A1* | 11/2014 | Sebring | ................ | H04N 23/661 |
| | | | | 382/284 |
| 2014/0343728 A1* | 11/2014 | Jun | ........................ | B63H 19/08 |
| | | | | 901/1 |
| 2017/0031146 A1* | 2/2017 | Zheng | ..................... | H04N 23/45 |
| 2018/0025636 A1* | 1/2018 | Boykin | ............ | G08G 1/096725 |
| | | | | 701/1 |
| 2018/0088440 A1* | 3/2018 | Gladnick | ................ | H04N 23/72 |
| 2018/0091731 A1* | 3/2018 | Yamamoto | ............. | H04N 23/69 |
| 2020/0296279 A1* | 9/2020 | Kasugai | ............... | H04N 23/667 |
| 2020/0329189 A1* | 10/2020 | Tanaka | .................... | G06T 17/20 |
| 2021/0306546 A1* | 9/2021 | Jönsson | ............... | H04N 23/667 |
| 2024/0223877 A1* | 7/2024 | Furze | ..................... | H04N 23/56 |
| 2024/0388793 A1* | 11/2024 | Agrawal | ................ | H04N 23/66 |

OTHER PUBLICATIONS

"TrailGuard AI" located at https://www.resolve.ngo/trailguard.htm
(Year: 2023).

* cited by examiner

*Primary Examiner* — Amy R Hsu
(74) *Attorney, Agent, or Firm* — Dorsey & Whitney LLP

(57) ABSTRACT

A system and method for capturing fames (e.g., images) in
an environment. In one example, a system includes a main
camera configured to capture target images or frames of the
environment and a trigger in communication with the main
camera and configured to selectively activate the main
camera. The trigger includes a trigger camera having a field
of view at least partially aligned with a field of view of the
main camera and a processing element in communication
with the trigger camera and the main camera, the processing
element selectively activates the main camera based on
scene images captured by the trigger camera.

27 Claims, 5 Drawing Sheets

TRIGGER FOR CAMERA TRAP

FIELD

The described embodiments relate generally to camera traps, such as those used to photograph wildlife or outdoor scenic images and video.

BACKGROUND

Remotely or automatically activated cameras ("camera traps") have been used by photographers to capture images of wildlife or outdoor scenes for quite some time. Such camera traps are typically activated by a trigger element. For example, rather than having the camera capture images continuously or on a set schedule, which may result in many undesirable images (e.g., capturing images of the scene where wildlife is not present) and can drain the battery (e.g., many such cameras are located in remote locations and do not have a continuous power source available).

Conventional examples of triggers include a "beam break," where a laser beam is emitted by a light source to extend over a particular area of a scene and a sensor is positioned opposite of the light source. When the sensor detects a break (e.g., the laser beam is reflected off of an object rather than reaching the sensor), the camera is activated to capture an image. Conventional triggers for camera traps, such as beam breaks, do not work in certain environments, such as underwater, and may also capture false positives or otherwise be triggered based on undesired objects, e.g., vegetation such as leaves blowing the wind. Additionally, these camera traps do not allow personalization for the types of objects that are captured, i.e., they will be activated by any type of object that causes the beam break and therefore photographers may end up with a number of unwanted images. For example, a photographer hoping to capture images of a mountain lion may end up instead with only images of deer.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure includes various systems and methods for a camera trap that can be selectively activated to allow desired image capture across multiple environments, including ones with multiple moving elements (e.g., debris and floating materials) and ones where conventional techniques, such as beam breaks may not work. In one example, the camera trap may include a "smart" trigger that may use a machine learned model or a detection algorithm to detect when a target of interest or another trigging event has occurred. The trigger then activates one or more accessories, such as a high definition camera, lights, or the like, to capture images or frames of the scene. In one example, the trigger can be trained to capture a desired type of motion, animal, or scenic elements (e.g., movement in a certain direction, positioning with a scene, or the like), such that the accessories are triggered selectively and fewer undesirable images are captured.

The trigger can be included as a component in a multi-trigger system to further help increase the quality and desirability of captured images. For example, a conventional trigger, such as a beam break, may be used to activate the smart trigger, where the smart trigger may activate a camera or other accessory only if certain trigger conditions are met. However, by utilizing the conventional trigger, the smart trigger can "sleep" (or go into a low power state) until there is some movement within the scene as determined by the beam break or other trigger element. Examples of the first trigger can be a first type of sensor, e.g., radio detection and ranging (RADAR), seismic, sound navigation and ranging (Sonar), acoustic sensors, or the like, and may be configured to activate a second trigger, e.g., a smart trigger, that may then activate a downstream accessory, such as a main camera, light strobe, or combinations thereof. The type of trigger or sensor element may be based on the environment (e.g., underwater or terrestrial), with a cascade of trigger elements, where the lower power elements may be "first" in the system to activate or detect objects within the environment that activates a higher powered or higher sensitivity element, which helps to converse power of the system.

The system described herein may be utilized in environments, such as underwater (e.g., within oceans, rivers, ponds, lakes, etc.), where conventional triggering mechanisms may not be effective and can enhance the quality and desirability of captured images.

Figure 1A:
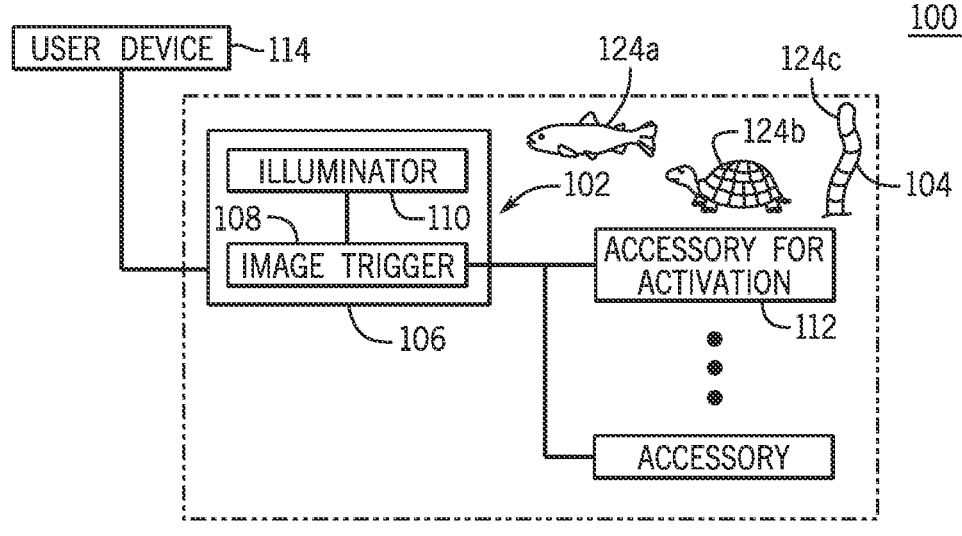
FIG. 1A illustrates a camera trap system within an environment.

Turning to the figures, FIG. 1A illustrates a simplified diagram of a camera trap system 100 in an environment 104. In this example, the camera trap system 100 includes a trigger 106 and an accessory 112. The trigger 106 and accessory 112 may be positioned to have an overlapping or partially overlapping field of view such that events occurring within the trigger 106 field of view will overlap with the field of view of the accessory 112. The environment 104 may be any area where images are desired to be captured, but in many cases may be an outdoor or wilderness area. The environment 104 may include objects 124a, 124b, 124c, such as animals, insects, vegetation, and so on. In one example, the environment 104 is a water or liquid environment (e.g., sea, lake, ocean, river) and the objects 124a, 124b, 124c may include aquatic animals (e.g., fish, whales, turtles), as well as seaweed, silt, debris, and vegetation.

The system 100 may also include a user device 114, such as a computer, smart phone, tablet, or the like, that may communicate with the trigger 106. In some instances, the user device 114 may communicate at select times (e.g., before the trigger 106 is positioned within the environment 104) and in other instances the user device 114 may be configured to communicate regularly with the trigger 106

(e.g., via a cellular or other wireless connection). For example, the user device 114 may be configured to communicate such as via a hardwired connection (e.g., cable) to the camera trigger 106 or the accessory 112 to allow transfer or data (e.g., images) and to provide instructions or trigger conditions to the trigger 106. In other examples, the trigger 106 may include an interface that may be used to interact with the device.

The accessory 112 can be a range of devices desired to be selectively activated by the trigger 106. Examples include, but are not limited to, cameras (e.g., high definition cameras or video recorders) (main or primary camera main camera), lights (e.g. strobes or other environmental illuminators), and the like. The accessory 112 may be coupled to the trigger 106 such that the trigger 106 can activate (e.g., provide power or control signals) to the accessory 112. In instances where the accessory 112 includes a main camera, the accessory 112 may have a field of view that overlaps at least partially if not fully with the a field of view of the trigger 106. In some instances, however, the trigger 106 may have a field of view that is larger than the accessory 112, which helps to ensure that the accessory 112 will be activated to capture movement of a desired object into the field of view of the accessory 112. It should be noted that in many instances multiple accessories may be included and the accessories may be arranged to be directly or indirectly activated by the trigger 106, e.g., a first accessory 112 may include a strobe light and a second accessory 112 may include a camera and the trigger 106 may activate the strobe light shortly before or as it activates the camera to allow the environment to be illuminated by the strobe light ahead of the camera capture.

Figure 1B:
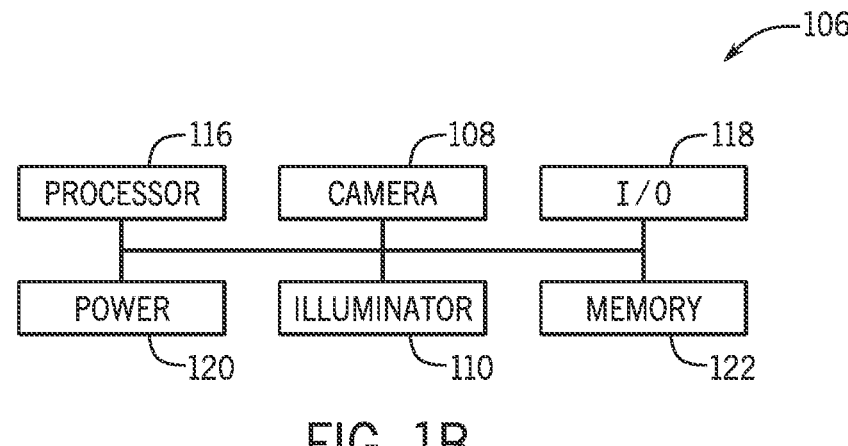
FIG. 1B is a simplified block diagram of the camera trap of FIG. 1A.

FIG. 1B illustrates a simplified block diagram of the trigger 106. With reference to FIG. 1B, the trigger 106 may include a trigger camera 108, such as an image sensor, configured to capture images (e.g., one or more image frames) of the environment 104. The camera 108 may include a lens or be in optical communication with a lens that defines a field of view for the trigger camera 108, where the field of view may at least partially overlap with a field of view of a main camera when the accessory 112 is a main camera. The lens configuration may be selected based on desired field characteristics, e.g., a fish eye lens may be used to enhance or increase the field of view of the trigger camera 108, a polarized lens may be used to filter certain wavelengths to assist in the triggering operations. Often, the trigger camera 108 may have a lower resolution than an accessory 112 camera to reduce the amount of memory required to store images captured by the trigger camera 108 and the reduced resolution may also allow faster processing of the images, reducing power consumption for the trigger 106.

An illuminator 110 or light may be included as part of the trigger 106 and be configured to illuminate or enhance optical characteristics of the environment 104 for capture by the trigger camera 108. In one example, the illuminator 110 may include an infrared (IR) light source to illuminate the environment 104 with IR light that may be less perceptible to select objects 124a, 124b, 124c so as to not interfere with the regular activities of the objects 124a, 124b, 124c, as well as allow operation under multiple conditions (e.g., dark environments such as underwater or night). However, in other instances, the illuminator 110 may emit light in the visible spectrum or may be configured to emit other types of energy that may be detectable or enhance the object detectability by the camera 108.

A processor 116 or processing element, such as a microcontroller, central processing unit, graphical processing unit, or the like, is configured to execute instructions, such as those making up a computer program (e.g., software). The processor 116 may include circuitry for performing various processing functions, such as executing specific software for calculations or tasks.

A power module 120 is configured to provide power to the various components of the trigger 106 and optionally the accessory 112. The power module 120 may include one or more batteries or wired power sources (e.g., power cable configured to connect to an external power source) or a combination thereof. The configuration and type of the power module 120 may be varied based on the environment 104 and operational characteristics.

An input/output interface 118 or a communication interface may be used to transmit and receive data between different components of the system 100. For example, the input/output interface 118 may be configured to receive user input from the user device 114 or provide output to a user, such as in the form of a graphical user interface, images, text, or the like. As one example, the input/output interface 118 may be configured to be in communication with the user device 114 to generate display images or graphical user interfaces that can be interacted with by the user. In some examples, the trigger 106 may include an interface, such as a touch screen or the like that allows the user to directly provide input to the trigger 106.

A memory module 122 is configured to store data, such as programming instructions, machine learned models, algorithms, software, as well as images and other data that may be captured by the camera 108. The memory module 122 may include different types of memory, such as static and dynamic storage, e.g., may include RAM, ROM, or the like.

The various components of the trigger 106 may be in communication, either directly or indirectly, with one another, such as through one or more system busses, wireless or wired communication pathways, or the like. In some implementations, various components of the trigger 106 may be mounted or coupled to a printed circuit board and traces may be used to interconnect certain elements.

Figure 2A:
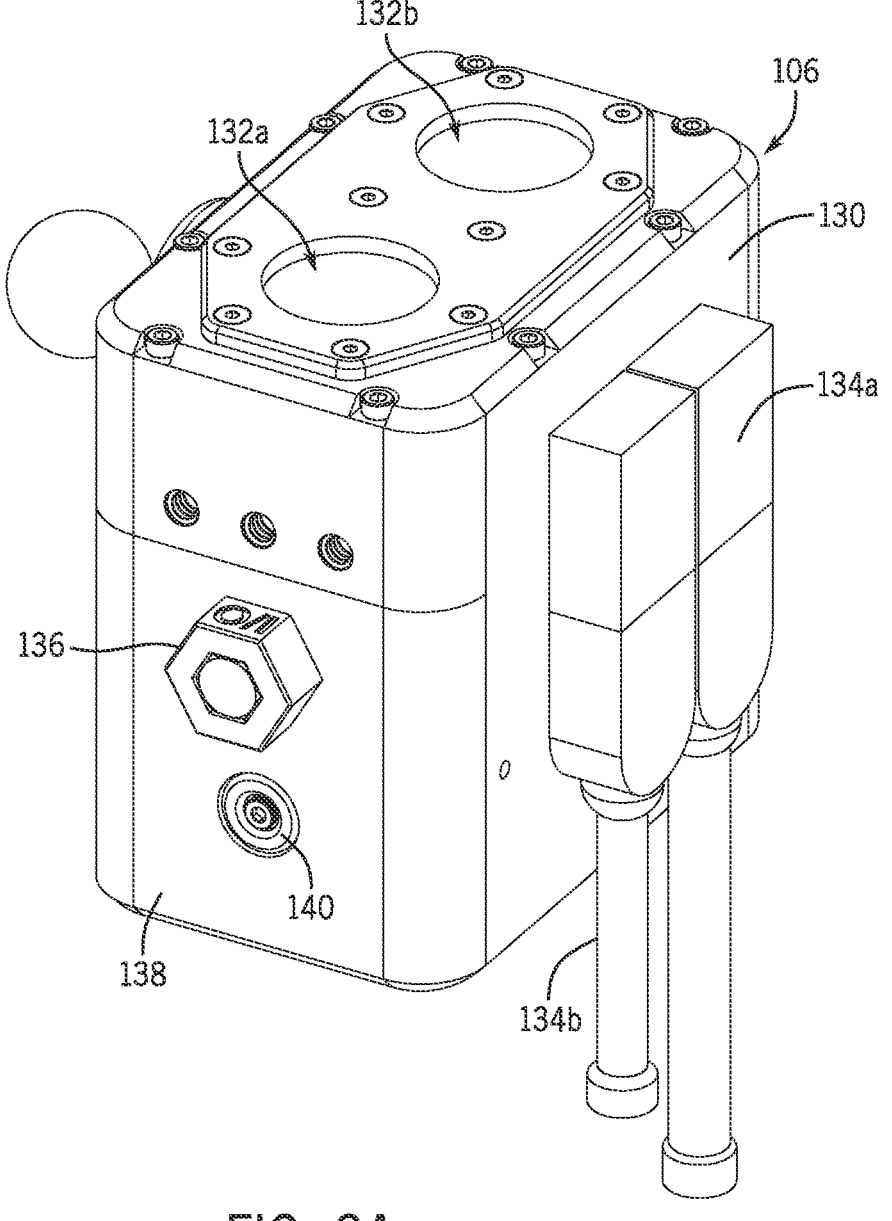
FIG. 2A is a side perspective view of an example of a camera trap.
Figure 2B:
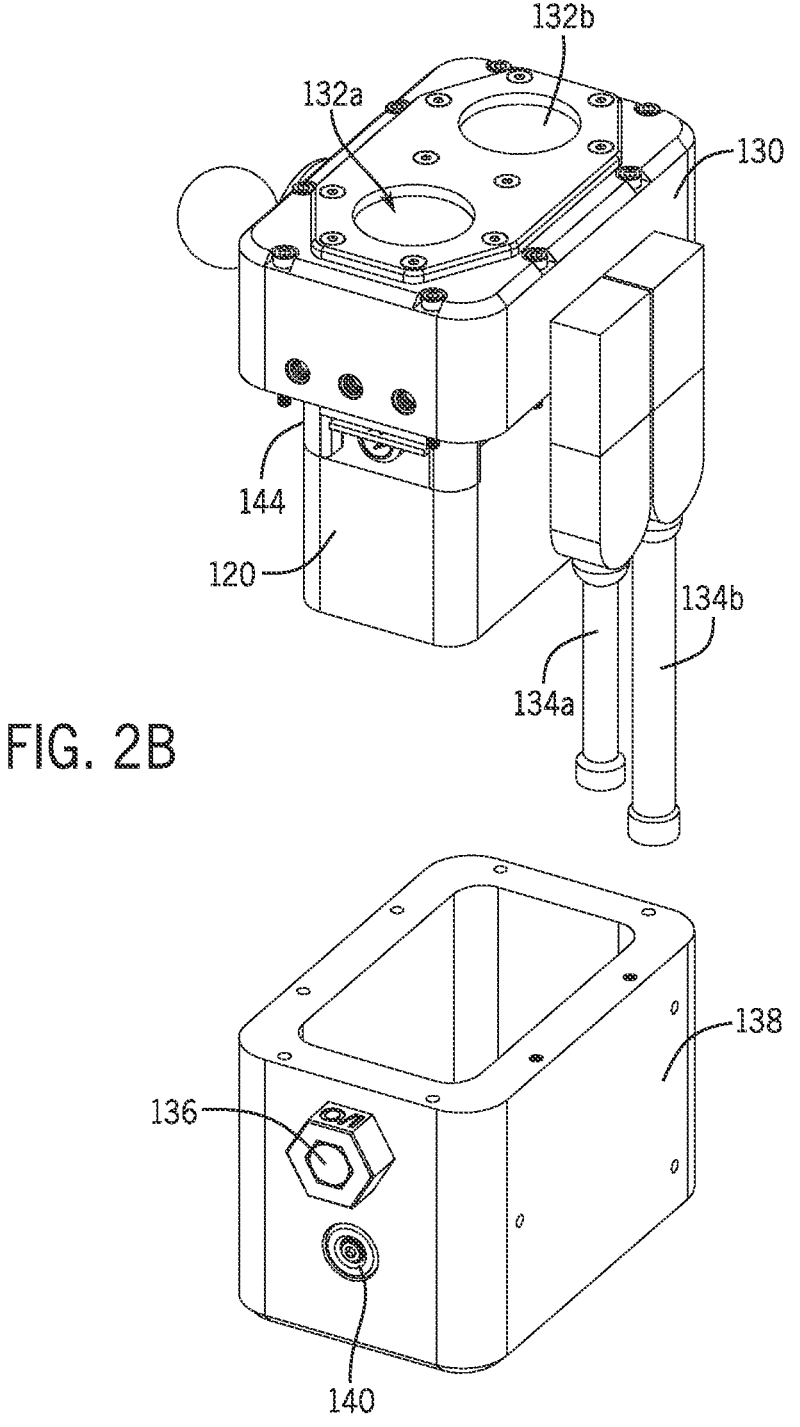
FIG. 2B is a partially exploded view of the camera trap of FIG. 2A.
Figure 2C:
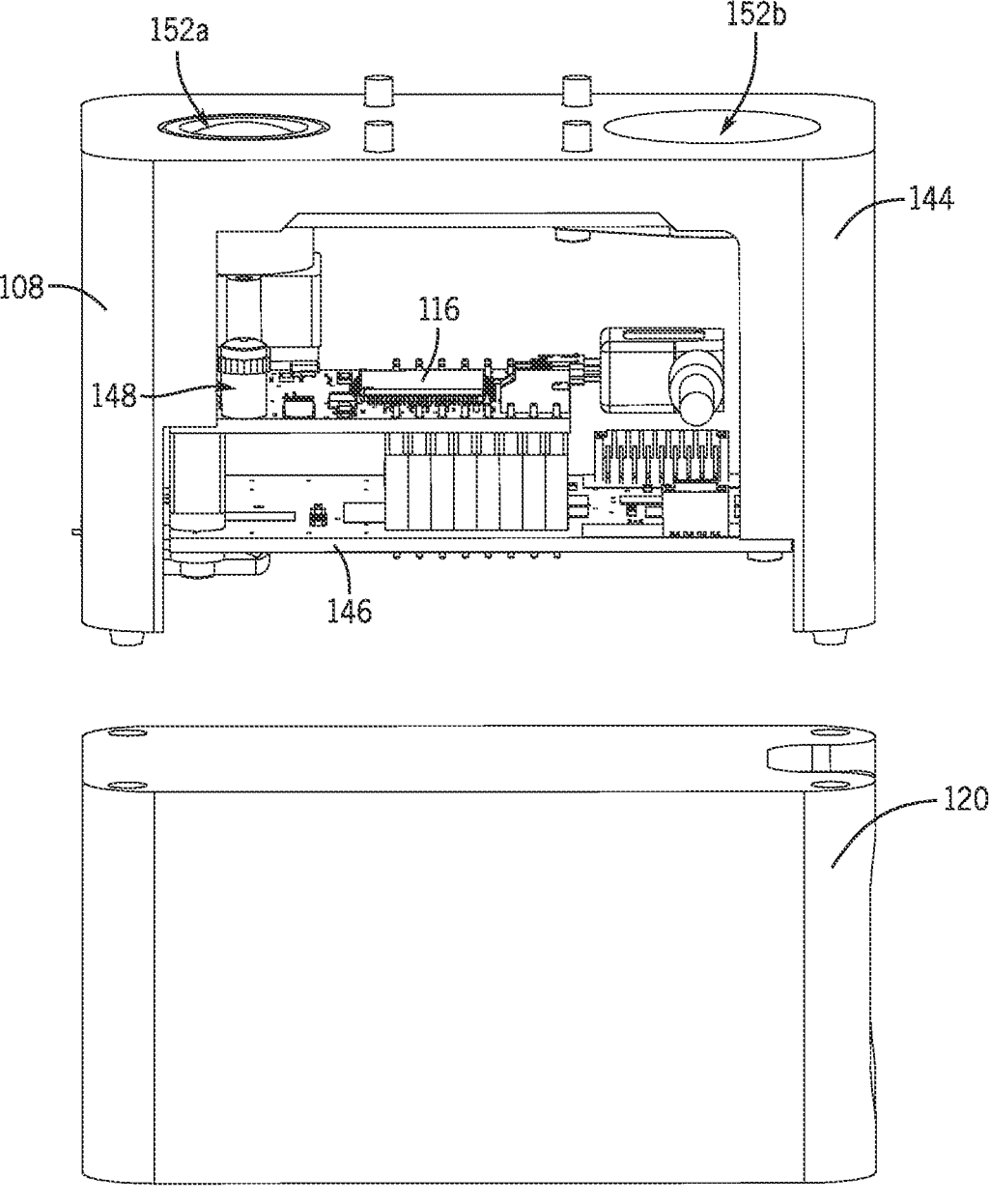
FIG. 2C is a partially exploded view of the camera trap of FIG. 2A.

FIGS. 2A-2C illustrate various views of an example of a trigger 106. With reference to FIGS. 2A-2C, the trigger 106 may include a housing 130, 138, which may be in the form of a first or top housing 130 and a second or lower housing 138. In this example, the top housing 130 may form a top portion and couple to a top surface of the lower housing 138 to define an enclosure for various electronic components of the trigger 106. In one example, the housing 130, 138 is configured to be watertight or waterproof, as well as limit entry of other elements, such as debris, that may be present in the environment 104.

The top housing 130 may include one or more apertures 132a, 132b therethrough. A first aperture 132a may be configured to align with the trigger camera 108 (e.g., image sensor) or trigger sensor (e.g., microphone or other type of sensing element) within the housing enclosure to allow the trigger camera 108 to have a field of view outside of the housing 130, 138. The second aperture 132b may similarly allow light or other energy, such as generated from the illuminator 110, to exit the housing 130, 138. In these instances, transparent or partially transparent lenses or other optical elements may be coupled over the apertures 132a, 132b. For example, a first lens, such as a fish eye or wide angle lens, may be coupled to the aperture 132a and optically aligned with the camera 108 and a second lens may be coupled to the second aperture 132*b* to allow IR light to exit from the trigger 106.

One or more connectors 134*a*, 134*b* may be coupled to the exterior of the trigger 106, such as to the top housing 130, and be configured to couple to the accessory 112 or user device 114. In some instances, the connectors 134*a*, 134*b* may include an electronic connector, such as a cable or wire, and be enclosed by a housing that may be waterproof. The configuration and number of the connectors 134*a*, 134*b* may depend on the environment 104 for the trigger 106, as well as the type and number of accessories 112. In the example shown in FIG. 2A, there may be two connectors 134*a*, 134*b* that may respectively connect to an accessory 112, e.g., connector 134*a* may couple to a high definition camera and connector 134*b* may couple to a strobe or other light source.

A switch 136 may be connected to the exterior of the housing 130, 138 and configured to activate the trigger 106, e.g., turn on the power module 120. In one example, the switch 136 may be configured to limit water ingress and so may be magnetically configured, e.g., removal of the bolt from the housing 130, 138 may activate an internal switch. However, in other configurations, other types of switches or activators may be included.

An anode 140 may be included. The anode 140 may be configured as a sacrificial element that may be used to protect other elements in the trigger 106 from corrosion, which may be important in corrosive environments, such as underwater. For example, the anode 140 may be a zinc material that may corrode faster than other elements on the trigger 106 and may be more easily replaced than replacing other elements of the trigger 106.

As can be appreciated, various sealing elements, such as O-rings, U-cups, gaskets, and the like may be included at various interfaces between components, e.g., between the top housing 130 and lower housing 138 and between the lenses and the apertures 132*a*, 132*b*, to help ensure a tight seal and waterproof enclosure.

With reference to FIG. 2B, a mount 144 is configured to support various components of the trigger 106 within the housing 130, 138. For example, the mount 142 may support a printed circuit board, various electronic modules, or both, such as the camera 108 and illuminator 110 within the housing 130, 138. The mount 144 may include apertures 152*a*, 152*b* which may be configured to align with the housing apertures 134*a*, 134*b* and align with the camera 108 and illuminator 110.

With reference to FIG. 2C, circuit boards 146, 148 may be positioned within the housing 130, 138 and coupled to the mount 144. In one example, a first circuit board 146 may include connections to the power module 120 and accessory 112 and a second circuit board 148 may include the trigger camera 108 and processor 116. Although it should be noted that while a single processor 116 is shown, in many examples, there may be a main processor, such as one coupled to the circuit board 146 and a camera processor, such as one coupled to the circuit board 148.

To assemble the trigger 106, the circuit boards 146, 148 and various electronic components may be coupled to the mount 144. The power module 120 (e.g., battery pack) may be electrically connected to the circuit board 146 and the various elements may be positioned within the lower housing 138 and the top housing 130 may be positioned over and secured to the lower housing 138 to define the waterproof enclosure. The lenses or optical elements may then be coupled to the apertures 134*a*, 134*b*.

Figure 3:
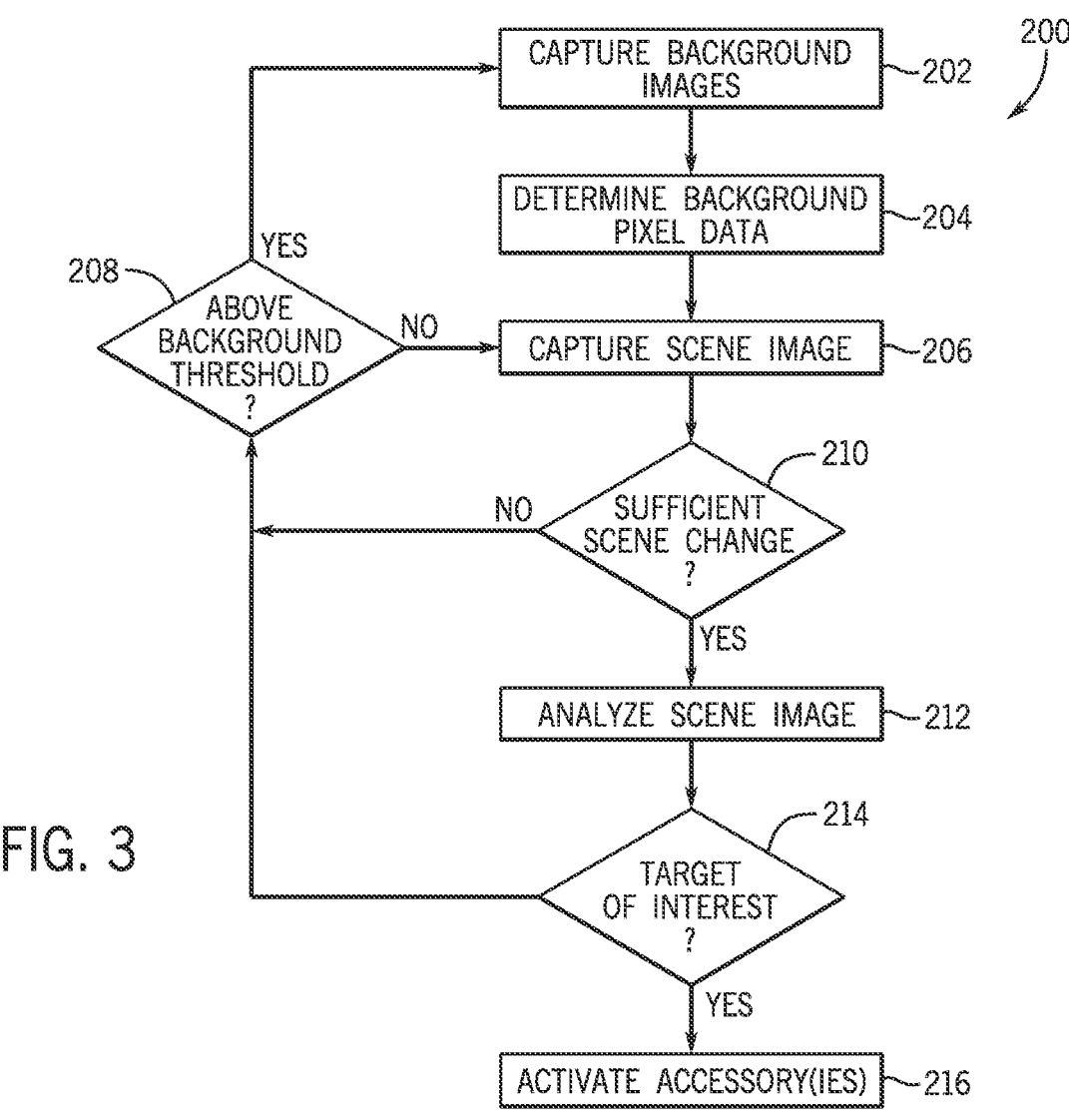
FIG. 3 is a flow chart illustrating a method for utilizing a camera trap.

FIG. 3 illustrates a method 200 to utilize the system 100 to capture images or frames within the environment 104. The method 200 may begin with operation 202 and one or more background frames or images are captured. For example, the trigger 106 may be configured to activate the trigger camera 108 or other trigger sensor to capture one or more images of the environment 104 to be used as background or scene images, which also may be referred to as trigger images. In one example multiple images, e.g., 20 to 70 and in one example 50 images, are captured and may be analyzed to determine a steady state or baseline image for detecting changes in the environment 104. It should be noted that although images are used in some embodiments, in other examples other signals (e.g., acoustic signals) may be used and the frames may be a sample of those signals over a period of time.

In operation 204, background pixel data may be determined. For example, the processor 116 may evaluate the background image or images to determine pixel values (e.g., color, hue, brightness, or a combination thereof) for the environment 104. The background pixels values may be used to determine a baseline value for the environment 104.

With the background or baseline determined, in operation 206 the trigger 106 may activate the trigger camera 108 to capture a scene image, e.g., image of the environment 104 including objects 124*a*, 124*b*, 124*c*.

In operation 210, the processor 116 may analyze the scene image or sets of images to determine if there are changes relative to the baseline. For example, the processor 116 may determine whether a threshold or predetermined number of pixels have changed in the scene image as compared to the background image or may determine whether there have been any pixel changes within a certain area of the frame or image (e.g., movement in a top quadrant). As one example, if an object 124*a* has moved within the environment 104, the movement will cause a change in pixel values, e.g., pixels in the baseline image may be differently colored from the scene image as the object 124*a* moves across the field of view of the camera 108. That is, the object movement will be captured at different locations on the images given the stationary position of the camera 108 relative to the movement of the object 124*a*. The change threshold may be variable and based on different environments 104 or objects to be captured, e.g., an less dense or less active environment may have a lower change threshold as compared to a highly dense or very active environment.

In a specific example, a histogram may be created based on an initial set of frames, e.g. 50 background images, and the background may be subtracted from the scene image in a particular format (e.g., monochrome) to determine the number of pixels that have changed between the current scene image and the background image. By utilizing monochrome or other filtering, the change detection can be quickly based on a more binary assessment, e.g., different or the same, rather than comparing more information from the captured images. In these instances, the images captured may be captured in monochrome format or may be converted to monochrome, such as to remove the hue information before analysis. However, in other instances, more information, such as pixel hue information can be used in assessing change. The change threshold may be based on a desired size or type of object to be captured. For example, by requiring a larger change threshold, smaller objects, may not be detected as changes and therefore may not act to trigger the system. This may help to ensure that only large changes (e.g., due to larger animals that may be more interesting to capture) act to activate the accessory 112.

In operation 210 if the change between the scene image and the background image does not reach the change threshold, the method 200 may proceed to operation 208. In operation 208, the trigger 106 (e.g., processing element 116) may determine whether a background threshold has been passed. For example, in certain instances, the trigger 106 may include a background threshold that refreshes or updates the background image at set periods of time or after a number of scene images. For example, in one embodiment, the background image may be updated every 50 frames, so that after 50 scene images, the background threshold will be exceeded. In these instances, the method 200 may return to operation 202 and a new background image may be captured. By updating the background image every so often larger changes (e.g., movement of slower moving objects into the field of view) can be captured and movement within any given scene image may be more accurately accounted for by the trigger 106. That is, the trigger 106 may then be more readily able to detect faster movement or smaller changes by updating the background image or baseline. Additionally, by updating the background image regularly, slow moving objects or "noise" in the environment may be taken into account and filtered out, e.g., shadows in the environment due to a changed position of the sun may not generate false triggering events as the changed position will be accounted for in the background image as it is updated over time.

It should be noted that in some instances the background image can be updated more regularly, but that by having a larger threshold between updates the power life of the trigger 106 may be extended. Additionally, in some embodiments, certain parts of the scene image may be masked or otherwise filtered or ignored with respect to changes. This may help to eliminate noise in an environment from generating false triggers. For example, if there is a tree branch in the environment 104 being moved due to wind or tides, the location of the tree branch in the background image can be masked and portions of the scene image that vary from the background image in that location can be ignored for purposes of detecting a change.

It should be noted that in certain environments, the scene image and background images may be captured by the trigger camera 108 while the illuminator 110 is activated. However, in certain instances, the illuminator may be undetectable or less detectable by animals than an accessory, e.g., IR light may be less detectable or visible to an animal as compared to visible light, but the IR light can still act to sufficiently illuminate the scene sufficient to allow analysis of the images (e.g., an IR filter can be used).

If in operation 208 the background threshold has not been reached, the method 200 can return to operation 206 and additional scene images can be captured.

With continued reference to FIG. 3, if in operation 210 (e.g., after a scene image has been captured) sufficient scene changes have been detected, such as by changes in the pixel valuations, the method 200 may proceed to operation 212. In operation 212, the processing element 116 of the trigger 106 may analyze the scene image. For example, a computer vision or image detection algorithm may be used to analyze the scene image and make predictions or assessments regarding any objects 124a, 124b, 124c captured within the scene image. As a specific example, a machine learned model trained on images of desired objects to be photographed or the environment 104, can be used to make assumptions about objects and the position of the objects within the scene image. This may allow, for example, the processor 116 to determine that the scene image includes a first type of fish, a first type of turtle, and a first type of vegetation and the location of the fish, turtle, and vegetation within the image frame.

In operation 214, the processor 116 may then further evaluate whether the identified objects or other information captured within the scene image is a target of interest or otherwise satisfies a capture setting or user preference for the trigger 106. More specifically, the identified objects or estimated objects from operation 214 may be evaluated against a user selection or preference or a target value to determine if the scene image satisfies the target value. As an example, if a target value may be a specific type of fish (e.g. a piranha) and if the scene image is determined to both have captured a fish object 124a and that the fish object 124a is likely to be a piranha (e.g., over a threshold confidence value), the target of interest may be considered to be satisfied. In some instances a confidence value may not be included and the assessment may be binary (e.g., is or is not a piranha).

It should be noted that in some instances operations 212 and 214 may be performed simultaneously, e.g., via a specifically trained machine learned model, but in other instances may be performed as separate operations, such as to account for updating or changing user preferences in terms of targets of interest. Similarly, in some embodiments, operation 210 may be omitted and all scene images or frames may be analyzed directly to determine if there is an object of interest. In some embodiments, the processor 116 may further be configured to detect two or more objects, e.g., a first type of a fish and a second type of fish, and after a select number or threshold of frames including the first object have been identified or captured, the processor 116 may trigger based only on the second object. For example, the system may be configured to capture both dolphin and sea turtle images but once a threshold of either dolphin or sea turtle images have been captured the system may be configured to trigger based only on the other of dolphin or sea turtles being present in the environment, such that the system does not trigger and waste energy, memory space, or both, capturing repetitive images. In these examples, the machine learned model may be trained on two or more objects of interest and then a threshold for triggering based on the classification or output of the machine learned model may include a threshold for different identified objects.

If in operation 214 the scene image does not include any objects of interest or targets of interest (e.g., scene or target requirements, such as a sunset or wave pattern), the method 200 may return to operation 208. If, however, a target of interest is identified, the method 200 proceeds to operation 216 and the accessory 112 is activated. For example, the trigger 106 may indicate that a triggering event has occurred, activating a first accessory, such as a strobe light and a second accessory such as a high definition camera (e.g., main camera). The activation of the accessory 112 allows the scene to be illuminated and captured while there is a high likelihood that the targets of interest are present within the field of view. In other words, by utilizing the trigger 106, the accessory 112 can be activated more precisely and accurately, extending power life for the accessory 112 (e.g., reducing unnecessary or undesirable activations) and allowing more desired images or other accessory outputs of the environment 104 to be captured. It should be noted that the accessory 112 may be configured to capture or activate multiple times based on a single trigger from the trigger 106, e.g., a high definition camera may capture a burst or multiple frames based on a trigger activation from the trigger 106.

Various examples of machine learned models or algorithms may be used based on the type of signal being detected by the trigger (e.g., images, acoustic signals, or the like). Further, the machine learned models may be trained on existing labeled data sets, e.g., images of underwater sea life or may be trained before deployment based on newly captured datasets. The machine learned models may include classifiers, such as a Tensor Flow image detection model, convolution neural network, or the like. In some instances, statistical processing may be used that may analyze the images or other signals as compared to background images or signals and assess likelihood of a particular object based on pixel size, movement, and the like.

Figure 4:
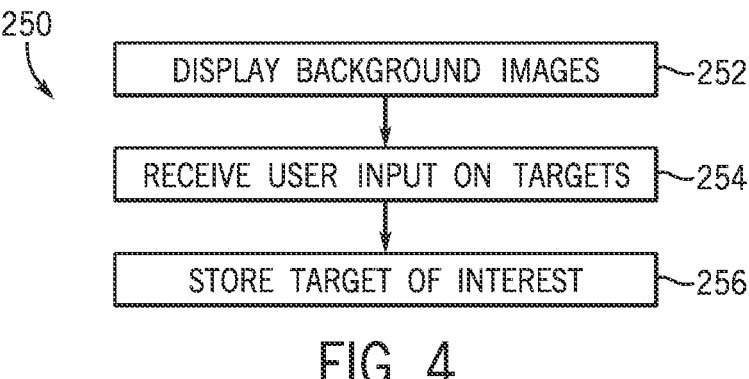
FIG. 4 is a flow chart illustrating a method to receive trigger conditions for a camera trap.

In some embodiments, the system 100 may be configured to allow a user to provide tailored targets for the trigger 106. FIG. 4 illustrates a flow chart for a method 250 for receiving user target input. With reference to FIG. 4, the method 250 may begin with operation 252 and one or more background images or scene images of the environment 104 may be displayed, e.g., presented on the user device 114. In operation 254, the trigger 106 may receive (e.g., from the user device 114) user input or user settings on targets of interest. For example, the user can indicate a position or location of an object within the background image or a template image, indicate movement trajectories desired to be captured, or otherwise provide artistic input to the trigger 106. In operation 256, the targets of interest or other target settings may be stored by the trigger 106. In these instances, the user can enhance or tailor the trigger 106 to allow not only triggering based on certain object types (e.g. a first type of fish vs. a second type of fish), but also on environment or movement conditions, e.g., the desired fish moving in a particular pattern or entering the scene from a particular location.

As one example, a user interface can be presented that may present various options for a user (e.g., an object selection, movement speed selection, or the like) that may allow the user to set the settings or parameters for the trigger 106. For example, the user can indicate a location of an object within the scene via an image template and that the trigger 106 may activated if an object of a particular size is identified in the selected area of the image template. In other embodiments, the user inputs may be used to select a desired machine learned model for the trigger 106, e.g., a model may be trained based a user's preferences to help enable more accurate capture of the desired aspects.

Often, conventional camera traps do not allow for such user specific triggers and so, for example, may activate a strobe light as soon as an animal sets off the trigger. In these instances, the strobe light or other accessory activation can change an animal's behavior and so further shots may not be captured and the initial capture may not be desirable. More specifically, conventional camera traps may activate as soon as an animal enters the scene, capturing an image with the animal facing away from the camera, and the activation of the strobe light may cause the animal to run away from the camera trap, leaving just a single image of the rear of the animal. On the other hand, using a system 100 such as the one described herein, the trigger 106 may wait until the animal is not only in the scene but also facing towards the accessory 112 (e.g., high definition camera) before activating the accessory 112. This helps to ensure that the image captured during the strobe light illuminating the scene is desirable.

Further, the system 100 and methods described herein allow accurate and desired images to be captured in a variety of environments, including underwater, where conventional triggering techniques (e.g., beam breaks, radar, etc.) do not work for many reasons, including silt or sand in the water, waves, no good location for a second sensor location (e.g., beam reflector, such as on a cliff or the like) Similarly, many conventional triggers for camera traps may not identify certain objects, such as reptiles, that may not have infrared detectable differences relative to the environment.

It should be noted that although the various examples are discussed with respect to images, the images may form frames of a video. Relatedly, although various examples have been discussed with respect to images (e.g., a machine learned model based on images) in other instances, the model may be trained and the trigger may be based on different types of signals, e.g., acoustic signals, seismic, RADAR, Sonar, or the like and in these instances frames of the signal may be evaluated to determine whether a triggering event has occurred. As such, the discussion of any particular embodiment is meant as illustrative only. Relatedly, although the object detection has been discussed with respect to one or more frames, in some embodiments, multiple frames (e.g., motion or video) may be used to analyze the environment.

In some examples, the trigger may be configured to determine whether certain thresholds for target images have been captured and update or change system preferences to prevent over-capture of certain target images. For example, the trigger may be configured to detect two or more different types of objects and may stop activating the accessory based on the presence of a first type of object after a threshold of the first object activations have been met. This may avoid, for example, over-consumption of resources such as memory storage or power dedicated to capturing a more common object so those resources may be conserved for capturing images of a more rare object once a threshold of the more common object images has been reached. As another example, the trigger may be configured to have a scenic element as a threshold, e.g., may not activate after a certain number of images in a particular lighting have been captured, helping to ensure a full gamut of images are captured, rather than just capturing images of more frequently occurring triggering events.

While various examples have included instances of a separate trigger and accessory, in some instances, the triggering algorithms may be integrated into the accessory, e.g., a high definition camera may be activated to capture both scene and target images and may be selected to activate a strobe when a triggering event has occurred with the camera capturing the main images when the strobe light is activated. In these instances, the system may eliminate additional hardware, instead relying on a single image sensor. To expedite processing time, in these instances, the processor may down sample the captured images. However, as compared other embodiments where a lower resolution camera is included as the trigger, the single camera system may not be able to capture motion of objects as they enter the scene as the field of view may be the same for both the trigger and accessory capture.

Relatedly, in some embodiments, the system may include a first trigger configured to activate a first accessory (e.g., activate a main camera) and a second trigger configured to activate a second accessory (e.g., strobe light), where the two triggers may be configured to have the same or different triggering events. This may allow the accessories to be differently activated, e.g., the strobes may only be activated in instances where there is a target object and low light whereas the main camera may be activated in instances where there is a target object regardless of light, which may help to provide variety in the scenic lighting and save power.

The above specification, examples, and data provide a complete description of the structure and use of exemplary examples of the invention as defined in the claims. Although various examples of the disclosure have been described above with a certain degree of particularity, or with reference to one or more individual examples, those skilled in the art could make numerous alterations to the disclosed examples without departing from the spirit or scope of the claimed invention. Other examples are therefore contemplated. It is intended that all matter contained in the above description and shown in the accompanying drawings shall be interpreted as only illustrative of particular examples and not limiting. Changes in detail or structure may be made without departing from the basic elements of the invention as defined in the following claims.

The term "computer readable medium" or "computer usable medium" as used herein refers to any medium that participates in providing instructions to processor for execution. Such a medium may take many forms, including but not limited to, nonvolatile media and volatile media. Nonvolatile media includes, for example, optical or magnetic disks, such as static storage or dynamic storage. Volatile media includes dynamic memory, such as memory.

All relative and directional references (including: upper, lower, upward, downward, left, right, leftward, rightward, top, bottom, side, above, below, front, middle, back, vertical, horizontal, right side up, upside down, sideways, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims. Any references to production or post-production are taken to apply to either production or post-production environments, methods, systems, or combinations thereof.

Other examples and implementations are within the scope and spirit of the disclosure and appended claims. For example, features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A system for activating an accessory comprising:
a trigger for capturing a plurality of scene frames within an environment and having a first field of view; and
an accessory for capturing a plurality of target frames within the environment and having a second field of view, wherein the first field of view and the second field of view at least partially overlap;
a processing element in communication with the trigger, wherein the processing element is configured to:
analyze a scene frame captured by the trigger to identify an object present in both the first field of view and the second field of view from among a plurality of different possible objects present within the scene frame;
based on the identified object being present in both the first field of view and the second field of view, activating the accessory.

2. The system of claim 1, wherein the trigger comprises a trigger camera and wherein the plurality of scene frames are a plurality of images.

3. The system of claim 1, wherein the trigger comprises a trigger camera, and the accessory is a main camera, wherein the target frames have a higher resolution as compared to scene frames captured by the trigger camera.

4. The system of claim 1, further comprising a waterproof housing, wherein:
the trigger and the processing element are mounted within the waterproof housing; and
a sacrificial anode is coupled to the waterproof housing and operates to protect the waterproof housing from corrosion.

5. The system of claim 1, further comprising an illuminator configured to illuminate a portion of the environment within the first field of view or the second field of view.

6. The system of claim 5, wherein the illuminator is configured to generate light in the infrared spectrum.

7. The system of claim 1, wherein the processing element is further configured to:
generate background pixel data based on one or more background frames captured by the trigger; and
analyze pixel data of the scene frame relative to the background pixel data to determine there is sufficient change between the one or more background frames and the scene frame to allow further analysis of the scene frame.

8. The system of claim 1, wherein the processing element is configured to analyze the scene frame by applying the scene frame to a machine learned model.

9. The system of claim 1, wherein the trigger is a first trigger and the accessory is a first accessory and the system further comprises a second trigger and a second accessory, wherein the second trigger is configured to activate the second accessory.

10. A method of activating an accessory for capturing images in an environment comprising:
capturing a background image of the environment with a trigger having a first field of view, wherein the accessory has a second field of view at least partially overlapping the first field of view;
capturing a scene image of the environment;
analyzing the scene image relative to the background image to determine that a change in the environment has occurred;
analyzing the scene image to identify an object present in both the first field of view and the second field of view from among a plurality of different possible objects present in the scene frame; and based on the identified object being present in both the first field of view and the second field of view, activating the accessory to capture a target image of the identified object.

11. The method of claim 10, wherein the accessory comprises at least one of a light or a main camera.

12. The method of claim 10, wherein analyzing the scene image to identify the object comprises:

detecting the object within the scene image; and determining that the object satisfies a user preference.

13. The method of claim 12, wherein detecting the object within the scene image comprises analyzing the scene image by a machine learned model.

14. The method of claim 10, wherein analyzing the scene image relative to the background image to determine that the change in the environment has occurred comprises:

comparing monochrome data of the background image to monochrome data of the scene image to determine a number of pixels have a changed value between the background image and the scene image; and determining that the number of pixels exceeds a change threshold.

15. The method of claim 10, wherein the background image and the scene image are captured by a first camera and the target image is captured by a second camera different from the first camera.

16. The method of claim 10, further comprising receiving a user input regarding the identified object, wherein the identified object comprises at least one of an animal type, an animal size, a movement direction of an animal across the environment, or a color value.

17. The method of claim 10, further comprising receiving an activation signal from a trigger and based on the activation signal, capturing the scene image of the environment.

18. The method of claim 16, wherein the trigger is a beam break from a laser system.

19. The method of claim 10, further comprising:

training a machine learned model based on targets of interest within the environment, wherein analyzing the scene image comprises analyzing the scene image via the trained machine learned model to determine that the object is present in the environment.

20. A system for capturing images in an environment comprising:

a main camera configured to capture target images of the environment; and a trigger in communication with the main camera and configured to selectively activate the main camera, wherein the trigger comprises:

a trigger camera having a field of view at least partially aligned with a field of view of the main camera; and a processing element in communication with the trigger camera and the main camera, wherein the processing element selectively activates the main camera based on identifying an object present in both the trigger camera field of view and the main camera field of view from among a plurality of different possible objects present in scene images captured by the trigger camera.

21. The system of claim 18, wherein the trigger further comprises an illuminator configured to illuminate the environment during capture of the scene image.

22. The system of claim 17, further comprising a strobe light in communication with the trigger, wherein the processing element is further configured to activate the strobe light based on the scene images captured by the trigger camera.

23. The system of claim 20, further comprising a waterproof housing, the waterproof housing including a sacrificial anode coupled thereto, wherein the main camera, the trigger, and the processing element are enclosed within the waterproof housing, and the sacrificial anode is operative to protect the waterproof housing from corrosion.

24. The system of claim 1, wherein the object is an animal.

25. The system of claim 1, wherein the trigger is a lower powered element than the accessory.

26. The system of claim 1, wherein the trigger is active for a first amount of time, and the accessory is active for a second amount of time less than the first amount of time.

27. The system of claim 2, wherein the accessory is a main camera configured to capture an image of the object, such that both the scene frame and the image include the object.

* * * * *